(No Model.)

G. F. SIMONDS.
BALL BEARING.

No. 449,963. Patented Apr. 7, 1891.

Witnesses.
Robert Everett.
J. A. Rutherford.

Inventor.
George F. Simonds.
By James L. Norris.
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 449,963, dated April 7, 1891.

Application filed December 30, 1890. Serial No. 376,289. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to the construction of cages for confining that class of spherical rollers or balls that are employed to diminish friction and for other purposes; and the invention consists in a cage comprising double sets of wires, between which the balls are loosely placed and by which they are retained in operative position with a minimum of friction or wear; and the invention further consists in the construction, combination, and arrangement of parts hereinafter more fully set forth, whereby the spherical rollers or balls have free lateral play between their retaining-wires and can be readily inserted and removed or omitted, as may be required.

Figure 1:
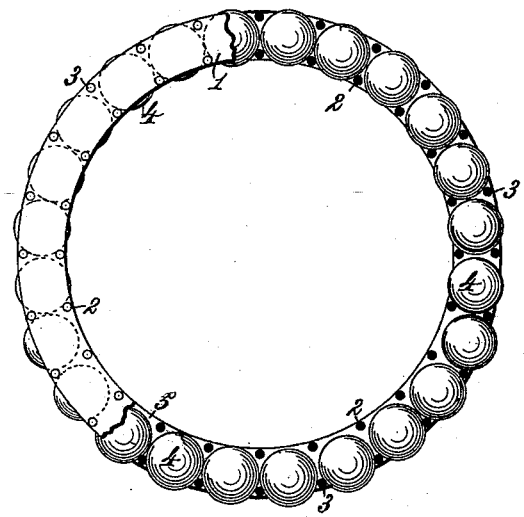
Figure 2:
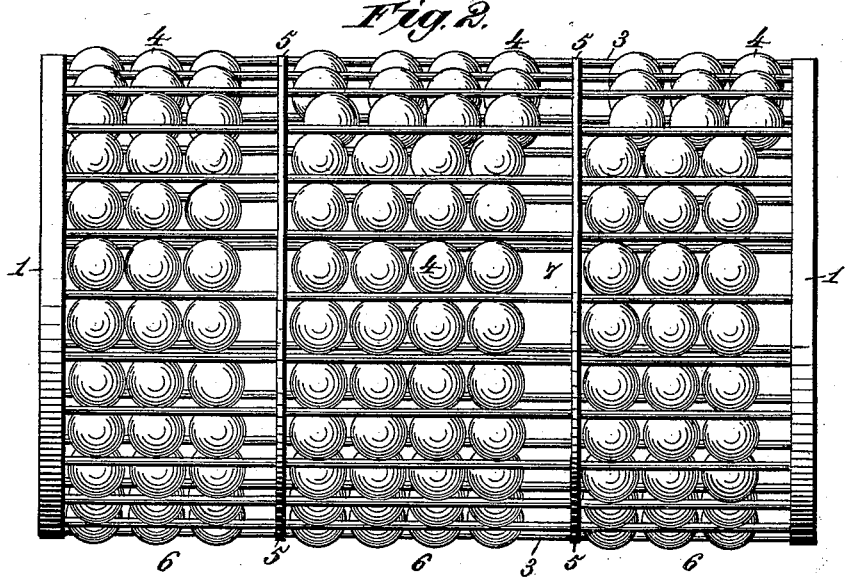
Figure 3:

In the annexed drawings, Figure 1 is a broken end elevation of an annular cage constructed according to my present invention and containing spherical rollers or balls for resisting or sustaining radial pressure or weight. Fig. 2 is a side elevation of the same, showing how several sets of spherical rollers or balls can be retained in separate compartments of the annular cage and in such a manner as to allow the balls to have free lateral play. Fig. 3 is a detail view of a portion of the annular cage, showing how the wire rods can be sprung apart to permit the insertion and removal of a ball or balls.

The numeral 1 designates the end rings of the annular cage. These rings 1 are connected by wire rods 2 and 3, that extend the entire length of the cage, and are arranged in concentric annular sets at sufficient distances apart to receive and retain the spherical rollers or balls 4, which project through the spaces between said wire rods in position to take the radial pressure or weight of a shaft or other part to which the cage of balls is applied, while the free rotation and play of the balls reduces friction to a minimum.

In cages of considerable length, or where it is deemed advisable to brace the wires or wire rods 2 and 3, they may receive additional support from intermediate rings 5, that need not be so heavy as the end rings of the case. By means of an intermediate ring or rings 5 the cage is divided into separate annular compartments 6, each of which is again divided by the wires 2 and 3 into the elongated spaces or chambers 7, that receive the spherical rollers or balls. The sets of balls placed in these spaces or chambers may each comprise any suitable number so arranged as to have free lateral play in contact with the entire surface of the bearing to which the cage of balls is applied.

It will be observed that the inner series of wires 2 and the outer series of wires 3 afford four points or bearings by which the several sets of spherical rollers or balls are retained in their separate chambers, and as the wires present but slight extent of surface for contact with the balls there is practically no wear of the parts.

By constructing the ball-chambers of wire in the manner described the individual balls can be easily inserted or removed whenever desired by simply springing apart the outer wire rods 3, as shown in Fig. 3. A convenient way is thus provided for removing and replacing a defective ball without loss of time.

In making the cage the rings 1 and 5 are first permanently connected by the inner and outer series of wire rods 2 and 3, and the outer wires 3 are then sprung slightly apart, while the balls 4 are inserted one after another. A cage of this construction is light, durable, and comparatively inexpensive, and provides a convenient and ready means for applying or removing the spherical rollers or balls in a body. By providing the cage with separate annular compartments 6, each composed of a series of ball spaces or chambers 7, formed by the wires 2 and 3, the balls in any compartment or series of chambers can be removed or omitted when they are not required in the bearing.

In another application, Serial No. 367,995, filed by me October 13, 1890, I have described and claimed a ball-bearing comprising the combination, with spherical rollers or balls, of a removable annular cage in which the balls are retained in a body and in which they have free lateral play and are capable of revolving in all directions, said cage being independent of the bearing-surfaces against which the balls act and between which said cage is adapted to move, whereby the said balls are free to move in varying lines, so that all parts of the bearing-surfaces will be subject to the rolling contact of said balls and the wear and friction distributed. This, therefore, I do not herein broadly claim.

What I claim is—

1. A cage for holding the spherical rollers or balls of a ball-bearing, said cage comprising double sets of connected wires or rods, between which the balls are retained in operative position, substantially as described.

2. An annular cage consisting of two end rings and inner and outer rods connecting said rings and forming therewith chambers to receive and retain the spherical rollers or balls of a ball-bearing, substantially as described.

3. An annular cage consisting of two end rings, an intermediate ring dividing the cage into compartments, and inner and outer rods connecting said rings and forming therewith chambers to receive and retain the spherical rollers or balls of a ball-bearing, substantially as described.

4. The combination, with spherical rollers or balls, of an annular cage consisting of rings and inner and outer wire rods and in which the outer wire rods are capable of being sprung apart to allow the insertion and removal of the said spherical rollers or balls, substantially as described.

5. The combination, with spherical rollers or balls, of a cage having wire rods that retain each of said balls at four points, substantially as described.

6. The combination, with spherical rollers or balls, of a cage having double sets of wire rods between which the balls are retained in operative position with free lateral play, said wires being capable of springing apart to permit the insertion and removal of the balls, substantially as described.

In testimony whereof I have hereunto set my hand and affixed my seal in presence of two subscribing witnesses.

GEO. F. SIMONDS. [L. S.]

Witnesses:
JAMES L. NORRIS,
JAMES A. RUTHERFORD.